(12) United States Patent
Doyen et al.

(10) Patent No.: US 7,981,467 B2
(45) Date of Patent: Jul. 19, 2011

(54) WEB-REINFORCED SEPARATOR AND CONTINUOUS METHOD FOR PRODUCING THE SAME

(75) Inventors: Wim Doyen, Wommelgem (BE); Roger Leysen, Mol (BE); Walter Adriansens, Mol (BE)

(73) Assignee: Vlaamse Instelling Voor Technologies Onderzoek (Vito), Mol (BE)

( * ) Notice: Subject to any disclaimer, the term of this patent is extended or adjusted under 35 U.S.C. 154(b) by 145 days.

(21) Appl. No.: 11/659,928

(22) PCT Filed: Aug. 10, 2005

(86) PCT No.: PCT/BE2005/000128
§ 371 (c)(1),
(2), (4) Date: Jul. 12, 2007

(87) PCT Pub. No.: WO2006/015462
PCT Pub. Date: Feb. 16, 2006

(65) Prior Publication Data
US 2007/0286949 A1   Dec. 13, 2007

(30) Foreign Application Priority Data
Aug. 11, 2004   (EP) .................................... 04447187

(51) Int. Cl.
*B05D 5/10*   (2006.01)
(52) U.S. Cl. ............... 427/207.1; 427/256; 428/339; 428/520; 428/521; 428/522

(58) Field of Classification Search ............... 427/207.1, 427/256; 428/339, 520, 521, 522
See application file for complete search history.

(56) References Cited

U.S. PATENT DOCUMENTS

| | | | |
|---|---|---|---|
| 2,940,871 A | 6/1960 | Smith-Johannsen | |
| 4,707,265 A | 11/1987 | Barnes, Jr. et al. | |
| 4,919,810 A * | 4/1990 | Itoh et al. ................. | 210/500.34 |
| 6,090,441 A | 7/2000 | Vining, Jr. et al. | |
| 6,242,127 B1 * | 6/2001 | Paik et al. ..................... | 429/145 |
| 2002/0164891 A1* | 11/2002 | Gates et al. ................... | 438/780 |
| 2003/0018094 A1* | 1/2003 | Ohya et al. ..................... | 521/50 |
| 2005/0074674 A1* | 4/2005 | Boone et al. .................. | 429/247 |

FOREIGN PATENT DOCUMENTS

| | | |
|---|---|---|
| DE | 102 38 940 A1 | 8/2002 |
| EP | 0 232 923 A1 | 8/1987 |
| EP | 0 431 494 A2 | 6/1991 |
| EP | 0 624 283 B1 | 12/1995 |
| EP | 0 692 830 A1 | 1/1996 |
| EP | 1 298 740 A2 | 4/2003 |
| JP | 2002-166218 | 6/2002 |
| WO | 96/26067 | 8/1996 |

* cited by examiner

Primary Examiner — Michael Kornakov
Assistant Examiner — Xiao Zhao
(74) Attorney, Agent, or Firm — Merchant & Gould P.C.

(57) ABSTRACT

A process for preparing an ion-permeable web-reinforced separator membrane includes the steps of: providing a web (2A) and a suitable paste (5), guiding the web (2A) in a vertical position, equally coating both sides of the web with the paste to produce a paste coated web (2B), and applying a symmetrical surface pore formation step and a symmetrical coagulation step to the paste coated web to produce a web-reinforced separator membrane.

22 Claims, 2 Drawing Sheets

WEB-REINFORCED SEPARATOR AND CONTINUOUS METHOD FOR PRODUCING THE SAME

FIELD OF THE INVENTION

The present invention is related to a web-reinforced separator membrane for use in electrochemical applications.

STATE OF THE ART

EP-A-0232 923 discloses a process for preparing an ion-permeable diaphragm comprising an organic fabric embedded in a film forming mixture of particulate inorganic hydrophilic material and an organic polymeric binder, comprising the steps of mixing the inorganic hydrophilic material with a solution of the polymeric binder in an appropriate solvent to form a slurry; uniformly spreading the slurry on an inert flat surface to form a sheet with a wet thickness of less than 2 mm; immersing any type of woven or non-woven stretched fabric into the wet sheet; removing the solvent by evaporation and or lixiviation while keeping the fabric stretched; removing the sheet from the said surface. The process is performed in the horizontal direction and the organic fabric is introduced after the sheet has been spread (cast) on an inert flat surface (glass plate). In practice the combination of (horizontal) spreading of the slurry on inert flat surface, followed by the immersing of a stretched organic fabric, leads to a product where the fabric is not embedded properly (nicely in the middle). Almost always the fabric appears at one side of the diaphragm, causing non-desired adhering gas bubbles when the diaphragm is used in e.g. a separator.

Further, a prerequisite for being able to immerse any type of stretched fabric is to use a slurry with low viscosity. This inevitably leads to a less-desired asymmetric pore structure, which gives rise to diaphragms having different pore structure and pore diameter at both side. With this respect the topside during fabrication (the shiny side of the finished product) will always be the tightest side, whereas the dull side (the bottom side during fabrication) is always the more open side. Also, the process is a very laborious and non-economical way of fabrication, since it can not be implemented as a continuous process.

EP-A-0692830 describes an extrusion process of thermoplastic sheet (300 μm thick) consisting of a blend of about 16.6 wt % of synthetic resin (e.g.: polyethylene), 66.6 wt % of an inorganic powder (e.g.: SiO2) and a 16.6 wt % of pore-forming agent (paraffin oil). Adhering to one side of the extruded thermoplastic sheet (in semi-molten state) an inorganic sheet (200 μm thick) containing 80 wt % of inorganic material (glass fiber) and 20 wt % of polyolefinic pulp as organic binder are added to give a laminate. The laminate is then pressure-moulded to unify the semi-molten sheet and cooled to remove the pore-forming agent, resulting in an inorganic material coated separator. This disclosure is thus a dry and continuous extrusion process wherein 2 materials are "joined" by a lamination process.

U.S. Pat. No. 4,707,265 describes a web impregnating apparatus for wherein a web is fed vertically between calendar rollers through a casting solution. The membrane is then guided between a casting drum and a casting blade through a quench bath. This setup cannot lead to a symmetrical membrane, as one side of the web is facing the quench bath and the other side is facing the drum. Due to this setup, the resulting membrane has smaller pores at the quench side than at the drum side. Further, as indicated in the document, the described setup easily leads to so-called "terry clothing", which can only be avoided by changing the thickness of the coating and the distance between casting drum and casting blade. Due to this limitation, it is very difficult to produce membranes of a broad thickness range.

U.S. Pat. No. 2,940,871 describes a process for coating a web with a plastic composition. A resinous dispersion is coated on a backing strip and heated to fuse the thermoplastic compounds in the dispersion. The matrix is then removed in a solvent bath, and the resulting coated web is dried and stored. Due to the vertical and upward setup, only relatively thick dispersions can be used (otherwise they run down the backing strip before they reach the heating device), which leads to a small thickness range. Further, it is difficult to control the pore size of the resulting membrane, as it is mainly controlled by the composition and mixing of the dispersion. Pore characteristics will therefore not be uniform over the complete membrane. Furthermore, the heating step is relatively difficult to control and expensive compared to a coagulation step in a quench bath.

There is a need for symmetrical web-reinforced separator diaphragms, where the web is nicely embedded in the diaphragm, without appearance of the web at a surface of the diaphragm. Also, a process for such fabrication should be continuous in order to be economically interesting. Further, it should be possible to produce products with various dimensions with equal properties over the complete surface of the diaphragm.

AIMS OF THE INVENTION

The present invention aims to provide a continuous process for manufacturing web-reinforced separator diaphragms, where the web is nicely embedded in the diaphragm, without appearance of the web at the surfaces of the diaphragm.

SUMMARY OF THE INVENTION

The present invention concerns a process for preparing an ion-permeable web-reinforced separator membrane, comprising the steps of: providing a web and a suitable paste, guiding said web, preferably downward, in a vertical position, preferably downward, equally coating both sides of said web with said paste to produce a paste coated web, and applying a symmetrical surface pore formation step and a symmetrical coagulation step to said paste coated web to produce a web-reinforced separator membrane. With symmetrical step is meant that the step is performed in the same way at both sides of the membrane. This leads to a membrane with symmetrical characteristics. Preferably, each step is also performed at the same time for both sides, and with the same exposure time (e.g. exposure to water vapour or coagulation bath).

The process of the present invention preferably further comprises the steps of providing a liner to one side of the web-reinforced separator membrane and winding the web-reinforced separator membrane together with said liner on a roll. The rolled-up separator membrane with the liner makes it possible to wash the membrane easily, especially when a corrugated liner is used, that allows fluid access to the membrane surface when the roll is immersed.

Further, the process preferably comprises a washing step. Said washing step can be performed in a washing bath (16) comprising e.g. water. Preferably, the washing bath (16) is at a temperature of between 10 and 80° C.

The coating step in the present invention is preferably performed by guiding the web through a double-sided coating system with automatic paste feeding.

The surface pore formation step preferably comprises symmetrically exposing both sides of the paste coated web to water vapour phase (e.g. water vapour or "cold steam" blanket).

The coagulation step preferably comprises symmetrically exposing both sides of the paste coated web to a coagulation bath comprising water, mixtures of water and an aprotic solvent selected from the group consisting of NMP, DMF, DMSO, DMAc), water solutions of water-soluble polymers (selected from the group consisting of HPC, CMC, PVP, PVPP, PVA), or mixtures of water and alcohol (such as ethanol, propanol and isopropanol). The coagulation bath is preferably at a temperature of between 40° C. and 90° C.

Another aspect of the present invention concerns a web-reinforced separator membrane, characterised in that the web is positioned in the middle of the membrane and both sides of the membrane have the same pore size characteristics.

Another aspect of the present invention concerns an apparatus for providing a web-reinforced separator membrane, comprising a web-unwinding station for web-tension control, a spreader roller, a coater with a double-sided coating system with automatic paste feeding with vertical (guided) web transportation, and guiding rollers in a heated coagulation bath.

The apparatus of the present invention can further comprise a liner feeder and a product winding station in a heated washing water bath, wherein the product winding station determines the rate of production.

SHORT DESCRIPTION OF THE DRAWINGS

DETAILED DESCRIPTION OF THE INVENTION

Figure 1:
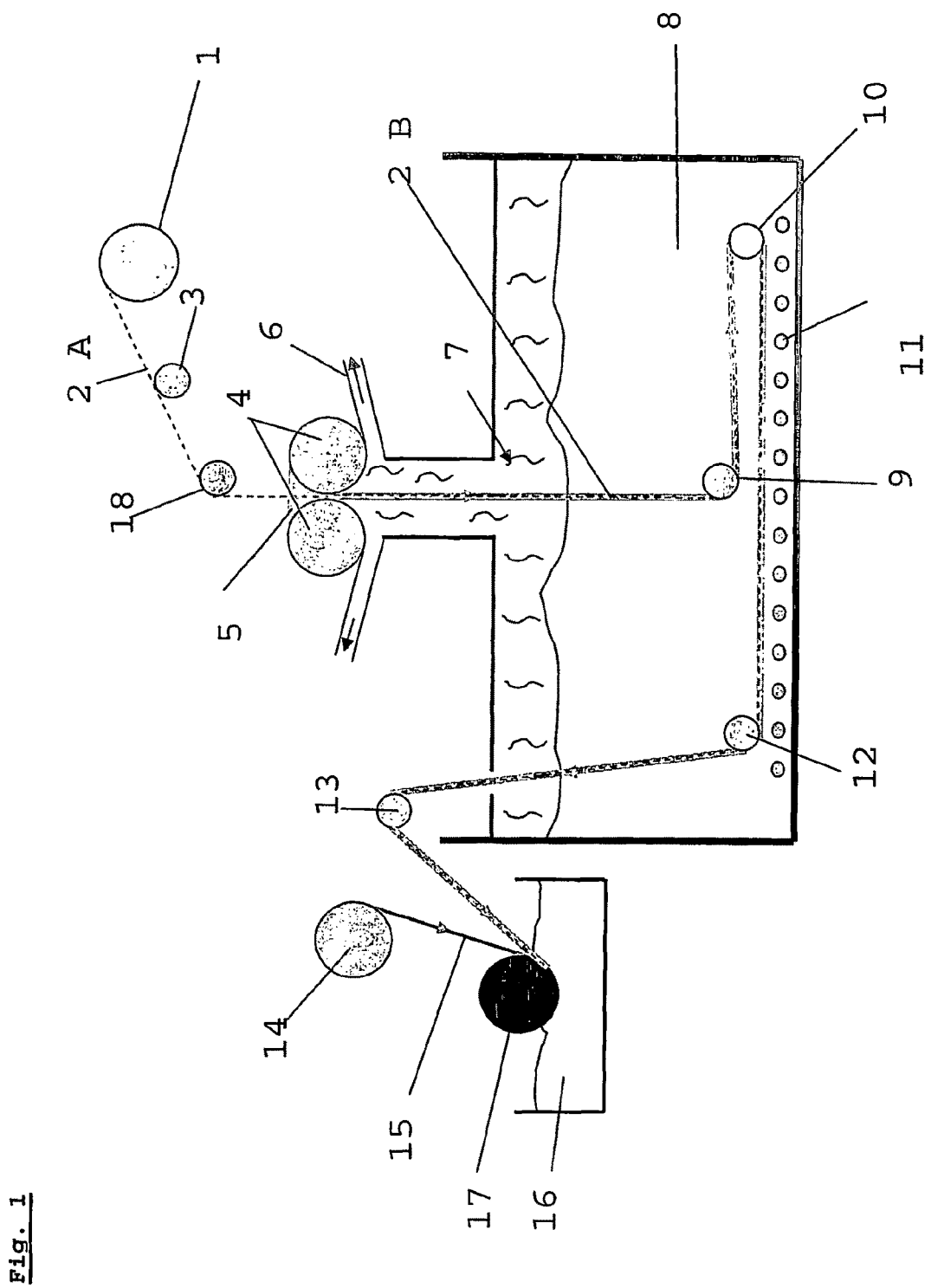
FIG. 1 illustrates the process according to the present invention.

Fabrication Steps:
Web preparation step: web (2A, woven or non/woven) unwinding; web guiding into vertical position (18 and 9) and web spreading (3) to prevent fold formation (perpendicular to the fabrication direction)
Web coating step: simultaneous double-side coating of paste 5 (e.g. organo-mineral) with double-sided coating system 4 and automatic paste feeding on both sides of the web (same level at both sides) to obtain a paste coated web (2B)
Surface pore formation step: contacting of the double-side coated web with water vapour phase 7. It is also possible to obtain an asymmetric web-reinforced membrane with different pore size characteristics at both sides by applying different conditions on both sides of the paste coated web.
Bulk formation step: coagulation of product into hot water bath 8
Product winding step: liner 14 feeding and winding together with product
Post-treatment step: washing out of chemicals in water reservoir 16
Drying step: drying of the product Fabrication Parameters
The following parameters can be envisaged when performing the method according to the present invention. It is evident that these parameters can be easily changed by the skilled in order to adapt the method to specific dimensions, products used or other considerations.
Production speed: between 0.2 and 20 m/min
Web tension: 15-35 N
Temperature of coagulation bath: 40-90° C.
Temperature of washing bath: 10-80° C.
Distance between the two coating rollers (of the coater): 450-1100 μm Web Examples:
Table 1 lists a few examples of web types that can be used for practising the present invention:

TABLE 1

| Web type | Web thickness (μm) | Roller distance (μm) | Product thickness (μm) |
|---|---|---|---|
| PES Spunlaid non-woven | 450 | 1100 | 800 |
| PA Woven | 100 | 450 | 300 |
| PEEK Woven | 350 | 900 | 650 |

Figure 2:
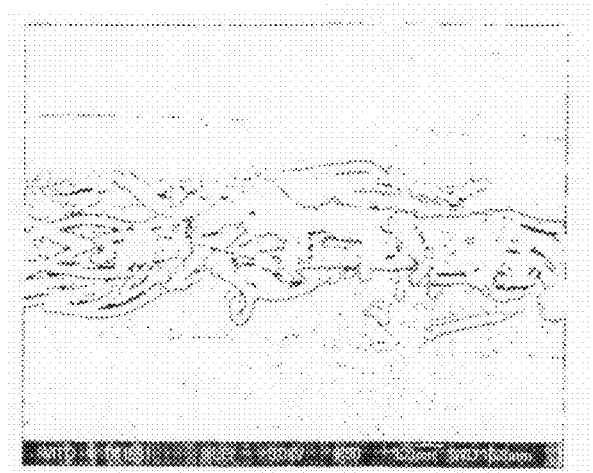
FIGS. 2 and 3 represent a membrane fabricated according to the present invention with respectively a PES Spunlaid non-woven web and a PA Woven web.
Figure 3:
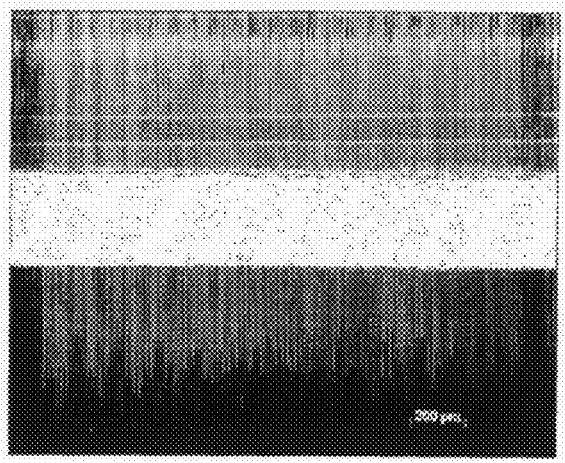
Figure 4:
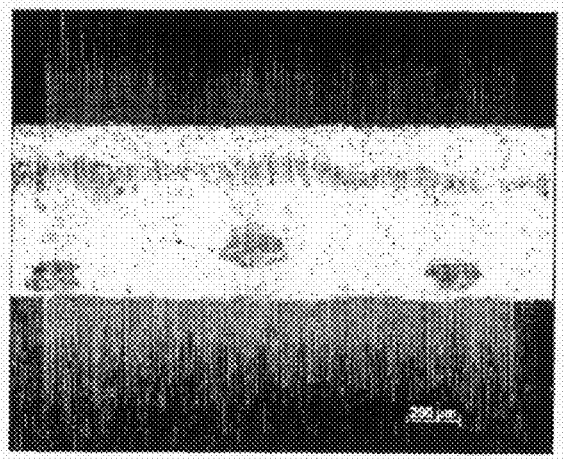
FIG. 4 illustrates a prior art membrane (such as in EP-A-0232 923)

FIGS. 2 and 3 respectively show a membrane fabricated according to the present invention with respectively a PES Spunlaid non-woven web and a PA Woven web.

As a liner, for example PES spunlaid non-woven web (thickness: 450 μm) can be used.

Paste Examples:
The paste can comprise
any hydrophilic inorganic filler material, such as $TiO_2$, $HfO_2$, $Al_2O_3$, $ZrO_2$, $Zr_3(PO_4)_4$, $Y_2O_3$, $SiO_2$, perovskite oxide materials, SiC, C(Pt/Rh/Ru) can be used;
any organic binder material such as PVC, C-PVC, PSf, PES, PPS, PU, PVDF, PI, PAN, PVA, PVAc and their grafted variants (sulphonated, acrylated, aminated, . . . ); and
a solvent such as NMP, DMF, DMSO or DMAc or a mixture thereof.

Equipment:
A preferred set-up for practising the current invention is depicted in FIG. 1. The set-up comprises:
Motor driven web-unwinding station 1 for web-tension control
Spreader roller 3 in front of coater 4
Coater with double-sided coating system 4 with automatic paste feeding 5 with vertical (guided) web transportation
Guiding rollers (rollers 18, 9, 10, 12 and 13) in heated coagulation basin 8
Liner 15 feeding 14
Product winding station 17 in heated washing water basin 16 (the used roller is the driver roller of the whole system)

The following exemplifies a possible practical embodiment of the present invention, using the equipment as described above. The following steps are executed:
Spreading of web 2A in the perpendicular direction to the fabrication direction
Vertical simultaneous doubleside coating of paste 5
Use of two roll-coating system 4 with automatic paste feeding
Coated web 2B is brought in contact with water vapour 7 for correct surface pore size
Liner 15 feeding 14 for enabling washing step in warm water bath 16

In order to obtain good results, a paste with good flow behaviour/properties should be used.

EXAMPLES

Example 1

Separator with Reinforced Woven PA Web

The reinforcing web used is a woven type of web based on PA-6.6 monofilaments, supplied by Sefar Inc. Filtration Division, CH-8803 Rueschlikon, Switzerland, of type Nitex 03-190/57. Its characteristics are as follows:

| | |
|---|---|
| Thickness | 100 µm |
| Filament thickness | 62 µm |
| Mesh size | 190 µm |
| Open area | 57% |
| Web width | 50 cm |

The composition of the used paste is:
46.99 wt. % of solvent (DMF)
13.25 wt. % of polymer (PSf Udel of type P-1800 NT)
39.75 wt. % of mineral filler (Ti-Pure® Dupont $TiO_2$, type R-100 with particle size of 0.32 µm)
The fabrication parameters are:
Production speed: 1 m/min
Web tension during fabrication: 15 N (in both directions (production direction and perpendicular direction thereon)
Distance between the two coating rollers 4: 450 µm
Distance between two coater rollers 4 and the water level of the coagulation bath 8: 40 cm
Temperature of coagulation bath 8: 65° C.
Temperature of washing bath 16: 35° C.
The resulted product had the following characteristics:

| | |
|---|---|
| Thickness | 250 µm |
| Web | nicely in the middle |
| Tensile strength | same as reinforcing web |
| Specific resistance | 4 Ωcm (30 wt. KOH, 25° C.) |

Example 2

Separator with Reinforced Spunlaid Nonwoven PA Web

The reinforcing web used is a spunlaid nonwoven type of web based on PA-6 bicomponent filaments (PET core; PA 6 skin), supplied by Colbond Inc. Nonwovens, Enka, N.C. 28728 USA, of type Colback® CDF 70. Its characteristics are as follows:

| | |
|---|---|
| Thickness | 450 µm |
| Filament thickness | 40 µm |
| Web width | 50 cm |

The composition of the used paste is:
54.55 wt. % of solvent (NMP)
13.64 wt. % of polymer (CPVC type H827, Mitsui, Japan)
31.82 wt. % of mineral filler (Al2O3 Alcoa type A-15SG with particle size of 1.7 µm)
The fabrication parameters are:
Production speed: 1 m/min
Web tension during fabrication: 25 N (in both directions (production direction and perpendicular direction thereon)
Distance between the two coating rollers 4: 1100 µm
Distance between two coater rollers 4 and the water level of the coagulation bath 8: 40 cm
Temperature of coagulation bath 8: 65° C.
Temperature of washing bath 16: 35° C.
The resulted product had the following characteristics:

| | |
|---|---|
| Thickness | 850 µm |
| Web | nicely in the middle |
| Tensile strength | same as reinforcing web |
| Specific electrolyte resistance: | 6 Ωcm (30 wt. KOH, 25° C.) |

INDUSTRIAL APPLICATIONS

The present invention can be used in the following applications:
Alkaline water electrolysis
Batteries (acid and alkaline)
Fuel cells
And combinations thereof.

The invention claimed is:

1. A process for preparing an ion-permeable web-reinforced separator membrane, comprising the consecutive steps of:
   providing a web and a suitable paste, the paste comprising a hydrophilic inorganic filler material, an organic binder material and a solvent,
   guiding said web in a vertical position,
   equally coating both sides of said web with said paste to produce a paste coated web,
   applying a symmetrical surface pore formation step comprising symmetrically exposing both sides of the paste coated web to a water vapor phase to determine a correct surface pore size without removing any of the inorganic filler material, and
   applying a symmetrical coagulation step to said paste coated web comprising symmetrically exposing both sides of the paste coated web to a coagulation bath comprising water to produce a web-reinforced separator membrane.

2. The process as in claim 1, further comprising the steps of providing a liner to one side of the web-reinforced separator membrane and winding the web-reinforced separator membrane together with said liner on a roll.

3. The process as in claim 2, wherein the liner is corrugated.

4. The process as in claim 1, further comprising a washing step.

5. The process as in claim 4, wherein the washing step is performed in a washing bath comprising water.

6. The process as in claim 5, wherein the washing bath is at a temperature of between 10° C. and 80° C.

7. The process as in claim 1, wherein the coating step is performed by guiding the web through a double-sided coating system with automatic paste feeding.

8. The process as in claim 1, wherein the coagulation bath is at a temperature of between 40° C. and 90° C.

9. The process as in claim 1, wherein the coagulation bath comprises water, a mixture of water and an aprotic solvent, a water solution of a water-soluble polymer or a mixture of water and an alcohol.

10. The process as in claim 9, wherein the aprotic solvent is selected from the group consisting of NMP, DMF, DMSO and DMAc and a combination thereof.

11. The process as in claim 9, wherein the water-soluble polymer is selected from the group consisting of HPC, CMC, PVP, PVPP, PVA and a combination thereof.

12. The process as in claim 1, wherein the paste comprises:
a hydrophilic inorganic filler material selected from the group consisting of $TiO_2$, $HfO_2$, $Al_2O_3$, $ZrO_2$, $Zr_3(PO_4)_4$, $Y_2O_3$, $SiO_2$, perovskite oxide materials, SiC, C(Pt/Rh/Ru);
an organic binder material selected from the group consisting of PVC, C-PVC, PSf, PES, PPS, PU, PVDF, PI, PAN, PVA, PVAc and their grafted variants; and
a solvent selected from the group consisting of NMP, DMF, DMSO or DMAc or a mixture thereof.

13. The process as in claim 1, wherein said process in performed continuously.

14. The process as in claim 1, wherein the web is guided downward in a vertical position before coating.

15. A process for preparing an ion-permeable web reinforced separator membrane, comprising the consecutive steps of:
providing a web and a suitable paste, guiding said web in a vertical position, the paste comprising a hydrophilic inorganic filler material, an organic binder material and a solvent,
equally coating both sides of said web with said paste to produce a paste coated web,
symmetrically exposing both sides of the paste coated web to a water vapour phase to form surface pores at the surfaces of the membrane without removing any of the inorganic filler material, and
symmetrically exposing both sides of the paste coated web to a coagulation bath comprising water to form pores in a majority of the membrane to produce a web-reinforced separator membrane.

16. The process as in claim 15, wherein the coagulation bath comprises water, a mixture of water and an aprotic solvent, a water solution of a water-soluble polymer or a mixture of water and an alcohol.

17. The process as in claim 16, wherein the aprotic solvent is selected from the group consisting of NMP, DMF, DMSO and DMAc and a combination thereof.

18. The process as in claim 16, wherein the water-soluble polymer is selected from the group consisting of HPC, CMC, PVP, PVPP, PVA and a combination thereof.

19. The process as in claim 15, wherein the paste comprises:
a hydrophilic inorganic filler material selected from the group consisting of $TiO_2$, $HfO_2$, $Al_2O_3$, $ZrO_2$, $Zr_3(PO_4)_4$, $Y_2O_3$, $SiO_2$, perovskite oxide materials, SiC, C(Pt/Rh/Ru);
an organic binder material selected from the group consisting of PVC, C-PVC, PSf, PES, PPS, PU, PVDF, PI, PAN, PVA, PVAc and their grafted variants; and
a solvent selected from the group consisting of NMP, DMF, DMSO or DMAc or a mixture thereof.

20. The process as in claim 15, wherein the process is continuous.

21. The process of claim 1, wherein the web has a thickness between 100 μm and 450 μm and wherein both sides of the web are coated with paste so that the web-reinforced separator membrane has a thickness in the range between 250 μm and 850 μm.

22. The process of claim 1, wherein the water vapor phase is obtained by evaporating water from the coagulation bath and collecting the evaporated water to feed the water to the paste coated web.

* * * * *